(12) United States Patent
Yang et al.

(10) Patent No.: US 10,767,839 B2
(45) Date of Patent: Sep. 8, 2020

(54) LIGHTING SYSTEM

(71) Applicant: DOW AGROSCIENCES LLC, Indianapolis, IN (US)

(72) Inventors: Yang Yang, Zionsville, IN (US); Frank Burroughs, Noblesville, IN (US); Kristen Curlee, Indianapolis, IN (US)

(73) Assignee: DOW AGROSCIENCES LLC, Indianapolis, IN (US)

( * ) Notice: Subject to any disclaimer, the term of this patent is extended or adjusted under 35 U.S.C. 154(b) by 982 days.

(21) Appl. No.: 13/804,156

(22) Filed: Mar. 14, 2013

(65) Prior Publication Data
US 2013/0258684 A1 Oct. 3, 2013

Related U.S. Application Data

(60) Provisional application No. 61/618,072, filed on Mar. 30, 2012.

(51) Int. Cl.
*F21V 14/02* (2006.01)
*A01G 9/26* (2006.01)
*A01G 7/04* (2006.01)
*H05B 47/11* (2020.01)
*H05B 47/105* (2020.01)

(52) U.S. Cl.
CPC ............. *F21V 14/02* (2013.01); *A01G 7/045* (2013.01); *A01G 9/26* (2013.01); *H05B 47/105* (2020.01); *H05B 47/11* (2020.01); *Y02B 20/46* (2013.01); *Y02P 60/149* (2015.11)

(58) Field of Classification Search
CPC .......... A01G 9/00; A01G 9/14; A01G 9/1438; A01G 9/20; A01G 13/0206; E04H 15/02; E04H 15/10
USPC ..... 47/17, 20.1, 58.1 LS, 58.1 R; 135/91, 96
See application file for complete search history.

(56) References Cited

U.S. PATENT DOCUMENTS

| | | | |
|---|---|---|---|
| 1,055,020 A | 3/1913 | Camph | |
| 1,631,488 A | 6/1927 | Jones | |
| 3,409,262 A | 11/1968 | Soule | |
| 3,882,306 A | 5/1975 | Armstrong | |
| 3,971,967 A | 7/1976 | Hawkins | |
| 4,163,342 A * | 8/1979 | Fogg et al. | ................. 47/58.1 R |
| 4,358,817 A | 11/1982 | Bielemeier | |
| 4,734,830 A | 3/1988 | Cristian et al. | |
| 5,012,398 A | 4/1991 | Jones et al. | |

(Continued)

FOREIGN PATENT DOCUMENTS

| | | |
|---|---|---|
| CN | 101936882 | 1/2011 |
| JP | H04356139 | * 4/1992 |

(Continued)

OTHER PUBLICATIONS

Hiawai, Hideyoshi, JPH04356139, English Translation.*

(Continued)

*Primary Examiner* — Magdalena Topolski
(74) *Attorney, Agent, or Firm* — Faegre Drinker Biddle & Reath LLP

(57) ABSTRACT

An apparatus and a method of using at least one of a distance sensor and a light intensity sensor to adjust the distance between an artificial light source and plant canopy to control light intensity at the plant canopy is disclosed.

14 Claims, 7 Drawing Sheets

(56) References Cited

U.S. PATENT DOCUMENTS

| | | | |
|---|---|---|---|
| 5,038,261 A * | 8/1991 | Kloos | F21V 21/14 362/286 |
| 5,323,567 A | 6/1994 | Nakayama | |
| 5,946,852 A * | 9/1999 | Oram et al. | 47/58.1 R |
| 5,993,030 A | 11/1999 | Barcel | |
| 6,312,139 B1 | 11/2001 | Baker et al. | |
| 6,554,450 B2 * | 4/2003 | Fang et al. | 362/231 |
| 8,299,445 B2 * | 10/2012 | Yamada et al. | 250/455.11 |
| 8,579,465 B2 * | 11/2013 | Yamada et al. | 362/231 |
| 9,021,739 B2 * | 5/2015 | Koo | A01G 7/045 250/454.11 |
| 2005/0005529 A1 | 1/2005 | Brault et al. | 52/63 |
| 2006/0032115 A1 | 2/2006 | Van Den Dool | |
| 2009/0272029 A1 * | 11/2009 | Aiking | A01G 7/04 47/1.43 |
| 2010/0031562 A1 * | 2/2010 | Browne et al. | 47/17 |
| 2010/0115830 A1 * | 5/2010 | Dube | 47/17 |
| 2010/0132751 A1 * | 6/2010 | Li | 135/96 |
| 2010/0289411 A1 * | 11/2010 | Smits et al. | 315/113 |
| 2011/0131876 A1 * | 6/2011 | Pettibone | A01G 31/042 47/65 |
| 2011/0143646 A1 * | 6/2011 | Van Der Kooij | 454/237 |
| 2011/0209400 A1 * | 9/2011 | Rooymans | 47/17 |
| 2012/0047824 A1 * | 3/2012 | Chang et al. | 52/173.3 |
| 2012/0103377 A1 * | 5/2012 | Sheridan | 135/91 |
| 2013/0000185 A1 * | 1/2013 | Tanase et al. | 47/17 |
| 2013/0263503 A1 * | 10/2013 | Bostdorff | 47/58.1 LS |
| 2013/0283683 A1 * | 10/2013 | Ringbom et al. | 47/58.1 LS |
| 2013/0298459 A1 * | 11/2013 | Bucove | 47/58.1 LS |
| 2014/0165462 A1 * | 6/2014 | Shigyo et al. | 47/58.1 LS |
| 2015/0007495 A1 * | 1/2015 | Tseng et al. | 47/17 |
| 2015/0014440 A1 * | 1/2015 | Nagadome et al. | 239/289 |
| 2015/0089867 A1 * | 4/2015 | Abbott et al. | 47/58.1 LS |
| 2015/0128489 A1 * | 5/2015 | Yamada et al. | 47/58.1 LS |

FOREIGN PATENT DOCUMENTS

| | | |
|---|---|---|
| JP | H1189427 | 4/1999 |
| JP | 2005027521 | 2/2005 |

OTHER PUBLICATIONS

International Search Report and Written Opinion of the International Searching Authority for PCT/US2013/031424, dated Sep. 4, 2013, 10 pgs.

Baccigalupi et al., Field Programmable Analog Arrays for Conditioning Ultrasonic Sensors, IEEE Sensors Journal, Aug. 2007, vol. 7, No. 8, pp. 1176-1182.

Bauerle et al., A Fiberoptic-based System for Integrating Photosynthetically Active Radiation in Plant Canopies, HortScience, vol. 39(5), Aug. 2004, pp. 1027-1029.

Bauerle, et al., The influence of temperature on within-canopy acclimation and variation in leaf photosynthesis: spatial acclimation to microclimate gradients among climatically divergent *Acer rubrum* L. genotypes, Journal of Experimental Botany, vol. 58, No. 12, 2007, pp. 3285-3298.

Bucci et al., Numerical Method for Transit Time Measurement in Ultrasonic Sensor Applications, IEEE Transactions on Instrumentation and Measurement, Dec. 1997, vol. 46, No. 6, pp. 1241-1246.

Dong, et al., An acoustic position sensor, 2003 American Institute of Physics, Review of Scientific Instruments, vol. 74, No. 11, Nov. 2003, pp. 4863-4868.

Fernandez et al., Canopy Architecture and Radiation Interception Measurements in Olive, Acta.Hort. 791, ISHS 2008, pp. 531-538.

LI-COR, Inc., Environmental Division, LI-190SA Quantum Sensor, www.licor.com, undated, 2 pgs.

International Preliminary Report on Patentability in International Application No. PCT/US2013/031424, dated Oct. 9, 2014, 7 pages.

* cited by examiner

LIGHTING SYSTEM

RELATED APPLICATION

This application claims the benefit of U.S. Provisional Application Ser. No. 61/618,072, filed Mar. 30, 2012, titled LIGHTING SYSTEM, the disclosure of which is expressly incorporated by reference herein.

FIELD

The present invention relates to methods and apparatus for providing artificial light to plant growing areas and in particular to methods and apparatus for adjusting the distance between an artificial light source and a plant canopy.

BACKGROUND

In greenhouse corn production, artificial light sources, such as high intensity discharge (HID) lamps, are extensively applied to provide higher light intensity at plant canopy. Traditionally, these HID lamps are installed on a light frame that is maintained at a fixed distance from the plant growing area. This arrangement does not compensate for changes in light intensity due to plant development or changes in light intensity due to weather or seasonal conditions. When plants are at younger stages, the distance between the lights and plant canopy is larger, and the light intensity at the plant canopy is lower; when plants have developed to more advanced stages, the distance between the lights and plant canopy is smaller, and the light intensity at plant canopy is higher. Weather and seasonal changes also introduce variation in light intensity at plant canopy. These variations in lighting conditions are not desirable, because they may introduce abiotic stress on the plants, and thus lead to variation in the quantity and quality of the final yield.

SUMMARY

In an exemplary embodiment of the present disclosure, an apparatus for controlling the light intensity received at a plant canopy is provided. In one embodiment, the apparatus comprises an artificial light source positioned generally above a plant canopy; a light intensity sensor positioned to measure a light intensity, the light intensity corresponding to one of the plant canopy and a distance above the plant canopy; and a first height adjustment unit configured to adjust the distance between the artificial light source and plant canopy; wherein the first height adjustment unit adjusts the distance between the artificial light source and plant canopy in response to the light intensity measured by the light intensity sensor. In another embodiment, the apparatus further comprises a distance sensor coupled to the artificial light source, the distance sensor measures a distance between the distance sensor and the plant canopy and a second height adjustment unit configured to adjust the relative position of the light intensity sensor to the artificial light source, wherein the second height adjustment unit adjusts the relative distance between the artificial light source and light intensity sensor to maintain the light intensity sensor at a predetermined distance above the plant canopy.

In another exemplary embodiment of the present disclosure, an apparatus for providing artificial light to a plant canopy is provided. In one embodiment, the apparatus comprises an artificial light source positioned generally above a plant canopy; a position sensor coupled to the artificial light source and measuring a distance between the distance sensor and the plant canopy; and a first height adjustment unit configured to automatically adjust the position of the artificial light source in response to the distance measured by the position sensor. In another embodiment, the height adjustment unit adjusts the position of the artificial light source to maintain a predetermined distance between the artificial light source and the plant canopy. In still another embodiment, the apparatus further comprises a light intensity sensor positioned to measure a light intensity, the light intensity corresponding to one of the plant canopy and a distance above the plant canopy; and a second height adjustment unit configured to adjust the relative position of the light intensity sensor to the artificial light source; wherein the second height adjustment unit adjusts the relative position of the light intensity sensor to the artificial light source to maintain the light intensity sensor at a predetermined distance above the plant canopy.

In still another exemplary embodiment of the present disclosure, a method of controlling the light intensity received at a plant canopy is provided. In one embodiment, the method comprises the steps of providing a plurality of plants defining a plant canopy; providing artificial light from an artificial light source positioned above the plant canopy; measuring a light intensity with a light intensity sensor at one of the plant canopy and a predetermined distance above the plant canopy; and adjusting the distance between the plant canopy and artificial light source in response to the measured light intensity. In another embodiment, the method further comprises the steps of determining the distance between the light intensity sensor and the plant canopy; and adjusting the position of the light intensity sensor relative to the artificial light source to position the light intensity sensor at the predetermined distance above the plant canopy. In still another embodiment, the method further comprises the steps of providing a target light intensity; comparing the measured light intensity with the target light intensity; increasing the distance between the plant canopy and artificial light source when the measured light intensity is greater than the target light intensity; and decreasing the distance between the plant canopy and artificial light source when the measured light intensity is less than the target light intensity repeated at predetermined intervals.

In yet still another exemplary embodiment of the present disclosure, a method of controlling the light intensity received at a plant canopy is provided. In one embodiment, the method comprising the steps of providing a plurality of plants defining a plant canopy; providing artificial light from an artificial light source positioned above the plant canopy; and automatically adjusting a distance between the plant canopy and the artificial light source to maintain a threshold separation distance between the plant canopy and the artificial light source. In another embodiment, the method further comprises the step of measuring a separation distance between the plant canopy and the artificial light source and when the separation distance is less than the threshold separation distance raising the artificial light source relative to the plant canopy. In yet another embodiment, the method further comprises the steps of supporting the artificial light source with a light frame; and supporting a distance sensor used to measure the separation distance with the light frame.

The above and other features of the present disclosure, which alone or in any combination may comprise patentable subject matter, will become apparent from the following description and the attached drawings.

BRIEF DESCRIPTION OF THE DRAWINGS

The detailed description particularly refers to the following figures, in which.

Corresponding reference characters indicate corresponding parts throughout the several views.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to the growth of plant samples within a greenhouse, it should be understood that the features disclosed herein may have application to growing plants in other environments.

Figure 1:
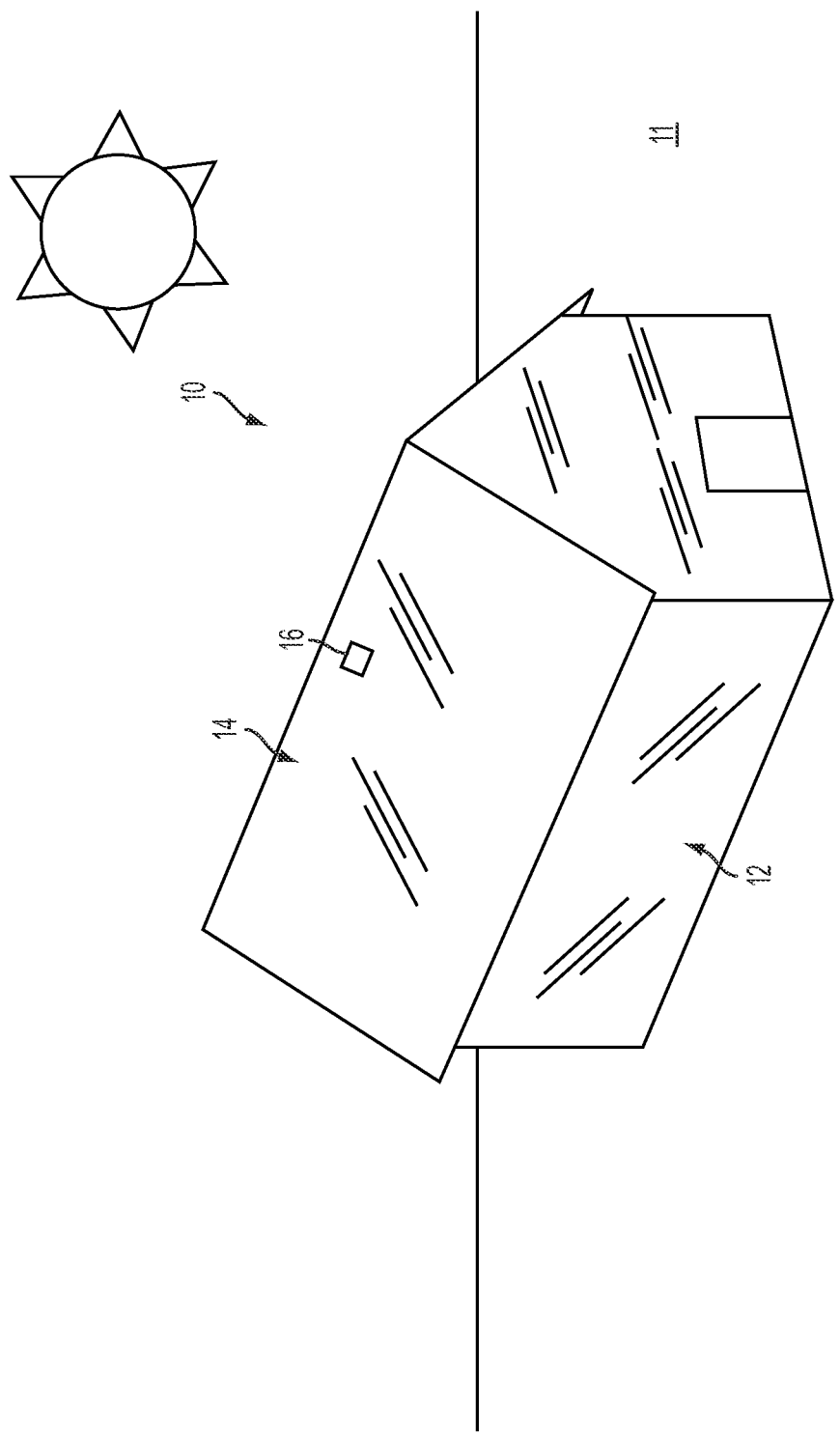
FIG. 1 illustrates an exemplary greenhouse.

Referring to FIG. 1, an exemplary greenhouse 10 is shown supported on the ground 11. Greenhouse 10 includes a plurality of walls 12 and a roof 14. As is known, the greenhouse 10 generally includes light transmitting panels on roof 14 and walls 12. These light transmitting panels permit sunlight to enter an interior of greenhouse 10. An outside lighting level sensor 16 may be positioned outside roof 14 or positioned inside greenhouse 10 to measure light intensity. An exemplary light intensity sensor is a photosynthetically active radiant (PAR) sensor.

Figure 2:
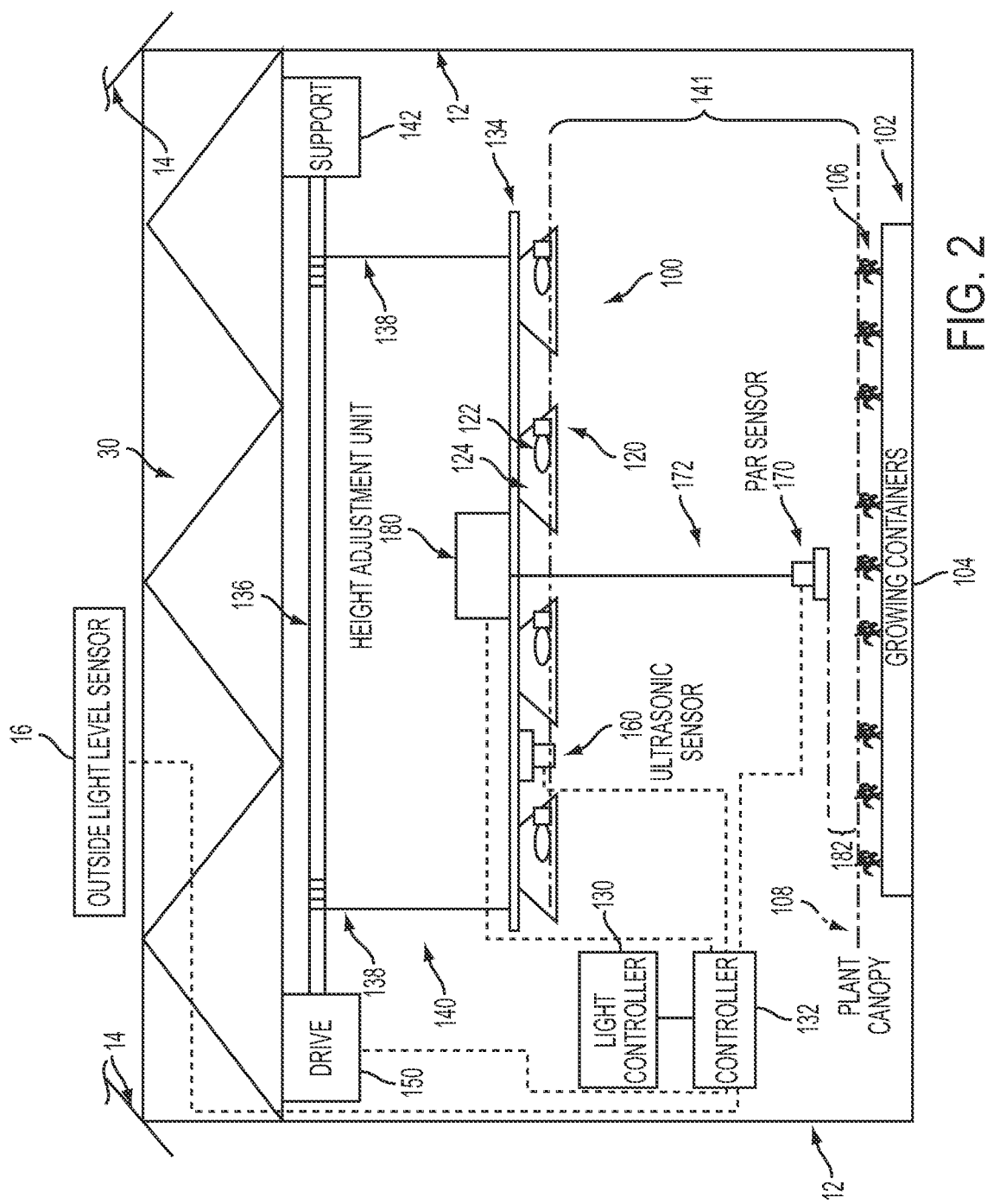
FIG. 2 illustrates an exemplary embodiment of a lighting system positioned relative to a first plant canopy of a group of plants.
Figure 3:
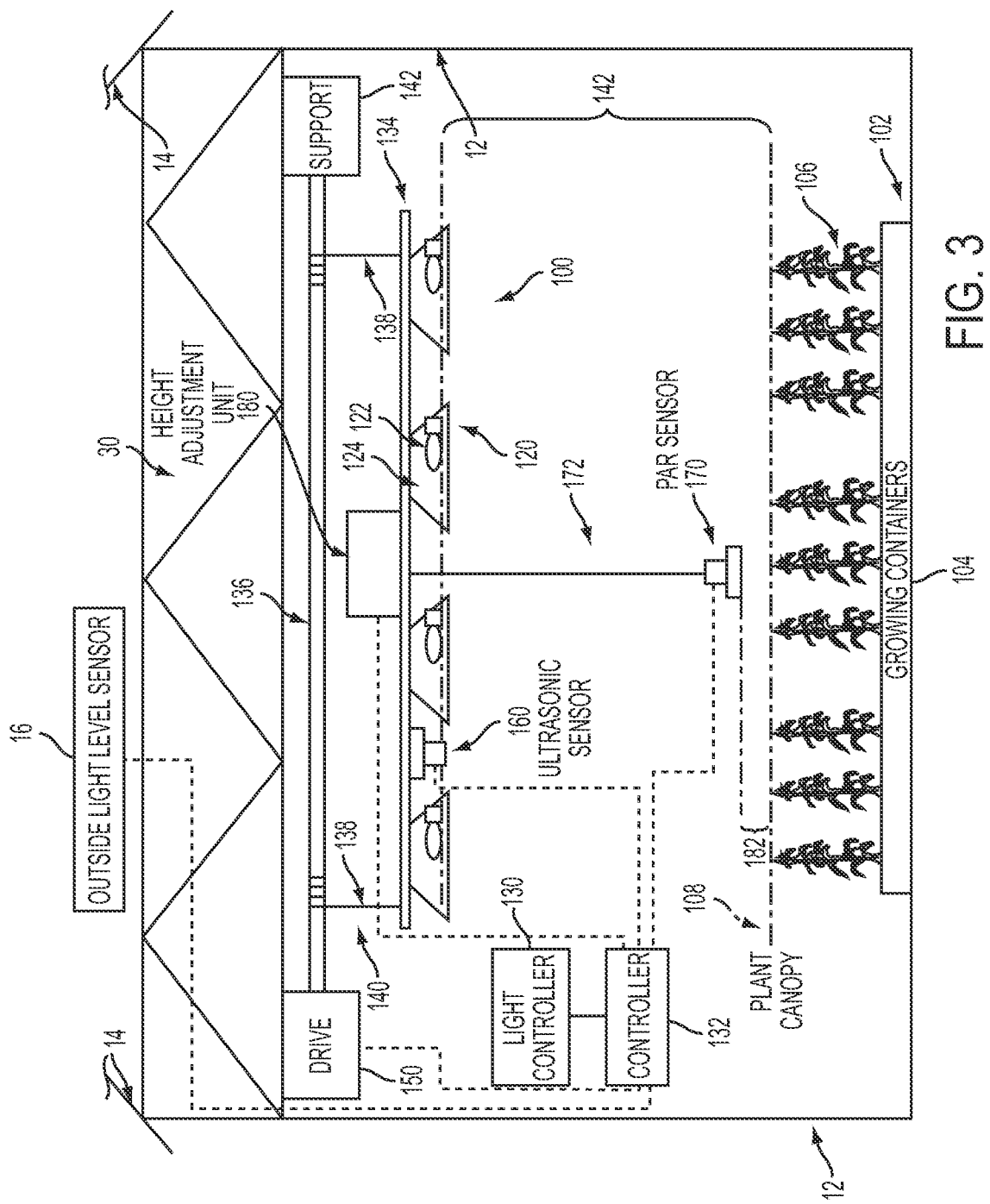
FIG. 3 illustrates the lighting system of FIG. 2 positioned relative to a second plant canopy of the group of plants.

Referring to FIG. 2, an interior of greenhouse 10 and an exemplary embodiment of a lighting system 100 are shown. Lighting system 100 is positioned generally above a plant growing area 102. The plant growing area in FIG. 2 includes growing containers 104 which support a plurality of plants 106 which extend upward from the growing containers 104. The top region of plants 106 defines a plant canopy 108. Exemplary plants include corn as illustrated. In FIG. 2, the corn plants 106 are immature plants early in the growing cycle. The same corn plants 106 are illustrated in FIG. 3 at a later time in the growing cycle. As illustrated in FIG. 3, the plants have grown resulting in the plant canopy 108 moving upward from a floor 20 of greenhouse 10.

Referring to FIG. 2, lighting system 100 includes a plurality of artificial lighting units 120 (one referenced) positioned to provide light to plant growing area 102. In the illustrated embodiment, artificial lighting units 120 includes a light source 122 and a light directing member 124 which assists in directing light produced by light source 122 towards plant canopy 108. Exemplary light sources include high intensity discharge lamps ("HID") lights and other suitable types of light sources. In one exemplary embodiment, three rows of lighting units 120, with seven lighting units 120 per row, are provided in lighting system 100.

In one embodiment, artificial lighting units 120 receive power from a power source, such as a utility grid. A light controller 130 controls when power is provided to artificial lighting units 120. In one embodiment, light controller 130 includes a dimming capability which controls an intensity level of the artificial lighting units 120.

As explained herein, lighting system 100 includes a controller 132 which controls the operation of lighting system 100. In the illustrated embodiment, lighting system 100 is suspended from a frame 30 of greenhouse 10. Lighting system 100 includes a light frame 134 to which artificial lighting units 120 are coupled. Light frame 134 is movable relative to frame 30 through a height adjustment unit 140. The height adjustment unit 140 moves artificial lighting units 120 to alter a value of distance 141, the distance between artificial lighting units 120 and plant canopy 108. In one exemplary embodiment, height adjustment unit 140 moves light frame 134 to maintain distance 141 between about seven feet and about eight feet. In another exemplary embodiment, height adjustment unit 140 maintains distance 141 at about seven and a half feet.

In the illustrated embodiment, height adjustment unit 140 includes a rotatable member 136 which is coupled to light frame 134 by a plurality of cables 138. A first end of rotatable member 136 is rotatable coupled to a support 142. In one embodiment, support 142 includes a bearing to permit the rotation of rotatable member 136 relative to support 142. The other end of rotatable member 136 is coupled to a drive 150.

Drive 150 is operatively coupled to rotatable member 136 to rotate rotatable member 136 about its longitudinal axis. When rotatable member 136 is rotated in a first direction, cables 138 are wrapped further around rotatable member 136 resulting in light frame 134 being raised relative to plant canopy 108. When rotatable member 136 is rotated in a second direction, opposite of the first direction, cables 138 are unwrapped from rotatable member 136 resulting in light frame 134 being lowered towards plant canopy 108. In the illustrated embodiment, drive 150 is operatively coupled to controller 132 which controls the operation of drive 150. In one embodiment, drive 150 is connected to controller 132 through a wired connection. In one embodiment, drive 150 is operatively coupled to controller 132 through a wireless network. Other suitable methods of raising and lowering light frame 134 may also be used.

Lighting system 100 further includes a distance sensor 160 is shown. In the illustrated embodiment, distance sensor 160 is an ultrasound sensor which sends out an ultrasonic signal towards plant canopy 108 and receives reflected energy back from plant canopy 108. Based on the elapsed time, controller 132 is able to determine a distance 141 between artificial lighting units 120 and plant canopy 108. Other suitable distance sensors include laser sensors, visible light sensors, and other suitable sensor technology. In one embodiment, a plurality of distance sensors 160 are provided and controller 132 determines a value of distance 141 based on a average of the sensed distance values.

Exemplary methods for measuring the distance to a plant canopy are disclosed in Baccigalupi, A. and Liccardo, A., 2007, "Field Programmable Analog Arrays for Conditioning Ultrasonic Sensors", *IEEE Sensors Journal*, Vol. 7 No. 8, pp. 1176-1182; Bucci, G. and Landi, C., 1997, "Numerical Method for Transit Time Measurement in Ultrasonic Sensor Applications", *IEEE Transactions on Instrumentation and Measurement*, Vol. 46 No. 6, pp. 1241-1246; Diaz-Espejo, A., et al, 2008, "Canopy Architecture and Radiation Interception Measurements in Olive", *Acta Hort*, (ISHS) 791, pp. 531-538; Dong, S., et al, 2003, "An Acoustic Position Sensor", *Review of Scientific Instruments*, Vol. 74 No. 11, pp. 4863-4868; Bauerle, W. and Bowden, J., 2004, A Fiberoptic-based System for Integrating Photosynthetically Active Radiation in Plant Canopies", *HortScience*, Vol. 35 No. 9, pp. 1027-1029; and Bauerle, W., et al., 2007, "The Influence of Temperature on Within-canopy Acclimation and Variation in Leaf Photosynthesis: Spatial Acclimation to Microclimate Gradients among Climatically Divergent *Acer rubrum* L. genotypes", *Journal of Experimental Botany*, Vol. 58 No. 58, pp 3285-3298; hereby incorporated by reference.

In the illustrated embodiment, the distance sensor 160 is at the same height above the plant canopy 108 as the artificial lighting unit 120. In other embodiments, the distance sensor 160 may be a known distance from the artificial lighting unit 120, such that the height of the artificial lighting unit 120 above the plant canopy 108 may be determined.

In one example embodiment, the artificial lighting unit 120 and distance sensor 160 are attached to 134. As shown in FIG. 2, light frame 134 supports the artificial lighting unit 120 and distance sensor 160 above plant canopy 108. As shown in FIG. 2, light frame 134 is suspended from a stationary frame, height adjustment unit 140. In one embodiment, height adjustment unit 140 is at a fixed distance above floor 40 of greenhouse 10. In another embodiment, height adjustment unit 140 is at a fixed distance above floor 40, but can move parallel to floor 40 of greenhouse 10.

Referring again to the example embodiment shown in FIG. 1, a light intensity sensor 170 for measuring light intensity is shown. An exemplary light intensity sensor is a photosynthetically active radiant (PAR) sensor, such as the LI-190 Quantum Sensor available from LI-COR Environmental, Lincoln, Nebraska. In one embodiment, light intensity sensor 170 measures incident light. In another embodiment, light intensity sensor 170 measures light reflected from plant canopy 108.

In the exemplary embodiment shown in FIG. 2, the light intensity sensor 170 is suspended from light frame 134 with a suspending member 172. In one embodiment, suspending member 172 is a cable. In another embodiment, suspending member 172 is a chain. In still another embodiment, suspending member 172 is a rigid member. Other suitable suspending members may also be used.

Figure 4:
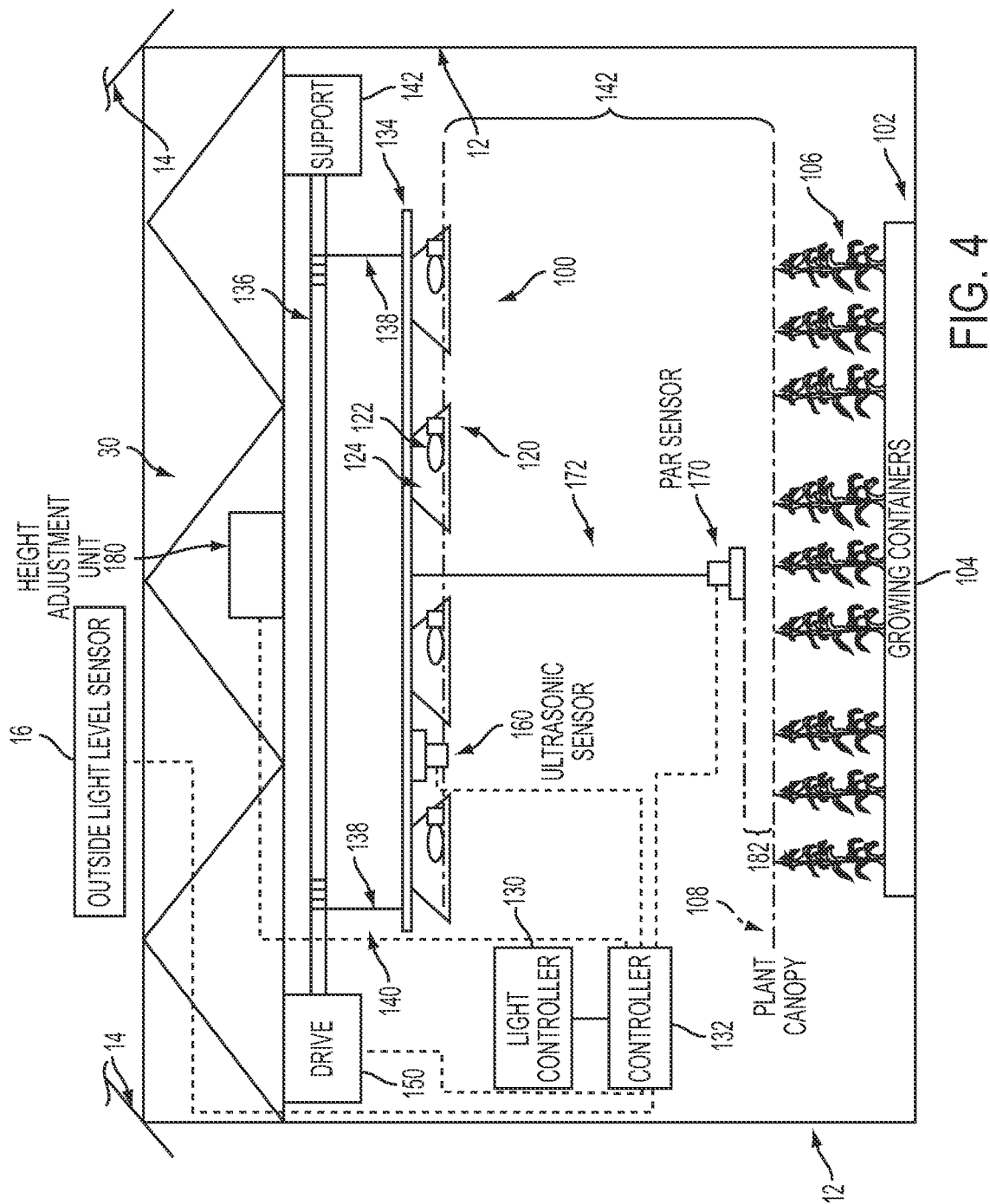
FIG. 4 illustrates another exemplary embodiment of a lighting system.

Referring to FIG. 2, a second height adjustment unit 180 adjusts the height of light intensity sensor 170 in relation to light frame 134. In the exemplary embodiment shown in FIG. 2, the second height adjustment unit 180 is positioned on light frame 134. In another embodiment illustrated in FIG. 4, second height adjustment unit 180 is positioned on frame 30.

In one example embodiment, second height adjustment unit 180 extends or retracts the length of suspending member 172, which adjusts the height of light intensity sensor 170 in relation to light frame 134. In one embodiment, controller 132 controls second height adjustment unit 180 to maintain light intensity sensor 170 at a set distance 182 from plant canopy 108.

Figure 5:
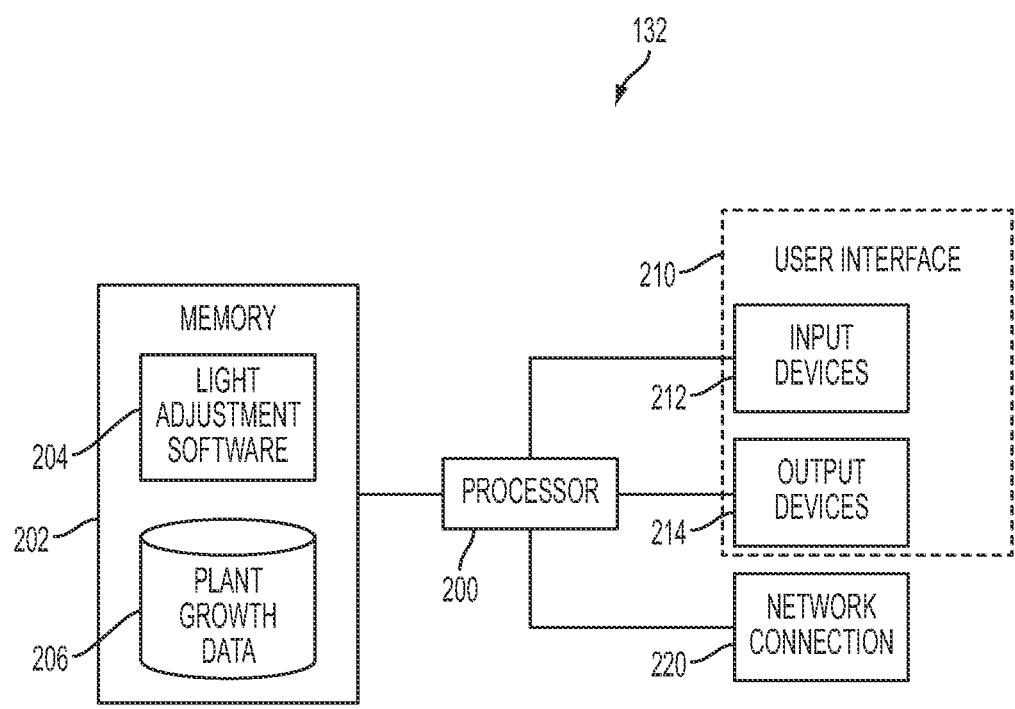
FIG. 5 illustrates an exemplary controller of the lighting system of FIG. 2.

Referring to FIG. 5, an exemplary embodiment of controller 132 is shown. Controller 132 includes a processor 200. Processor 200 has access to memory 202. Memory 202 includes light adjustment software 204 which when executed by processor 200 controls the operation of system 100. Although illustrated as software, the functionality of light adjustment software 204 may be implemented as software, hardware, or a combination thereof. Memory 202 may include additional data including databases 206 of information related to the plant growth data and other system information.

In the illustrated embodiment, controller 132 includes a user interface 210. User interface 210 includes one or more input devices 212 and one or more output devices 214. Exemplary input devices include a keyboard, a mouse, a pointer device, a trackball, a button, a switch, a touch screen, and other suitable devices which allow an operator to provide input to controller 132. Exemplary output devices include a display, a touch screen, a printer, and other suitable devices which provide information to an operator of controller 132. Through user interface 210 an operator may vary the operating parameters of system 100 and/or receive information related to the performance of system 100.

In one embodiment, controller 132 is a central controller. In one embodiment, controller 132 includes a plurality of controllers which communicate to control the operation of system 100. In the illustrative embodiment, controller 132 may include one or more processors 200 operating together and one or more memories 202 accessible by processors 200. The memory 202 associated with the one or more processors 200 may include, but is not limited to, memory associated with the execution of software and memory associated with the storage of data. Memory 202 includes computer readable media. Computer-readable media may be any available media that may be accessed by one or more processors 200 and includes both volatile and non-volatile media. Further, computer readable-media may be one or both of removable and non-removable media. By way of example, computer-readable media may include, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which may be used to store the desired information and which may be accessed by processor 200. In one embodiment, processor 200 provides one or more signals through a network connection 220 over a network to a remote device (not shown). In one embodiment, processor 200 communicates with distance sensor 160, drive 150, light intensity sensor 170, and second height adjustment unit 180 over one or more networks. Exemplary networks include wired networks, wireless networks, local area networks, wide area networks, cellular networks, the Internet, and other suitable networks for transferring information between devices.

Figure 6A:
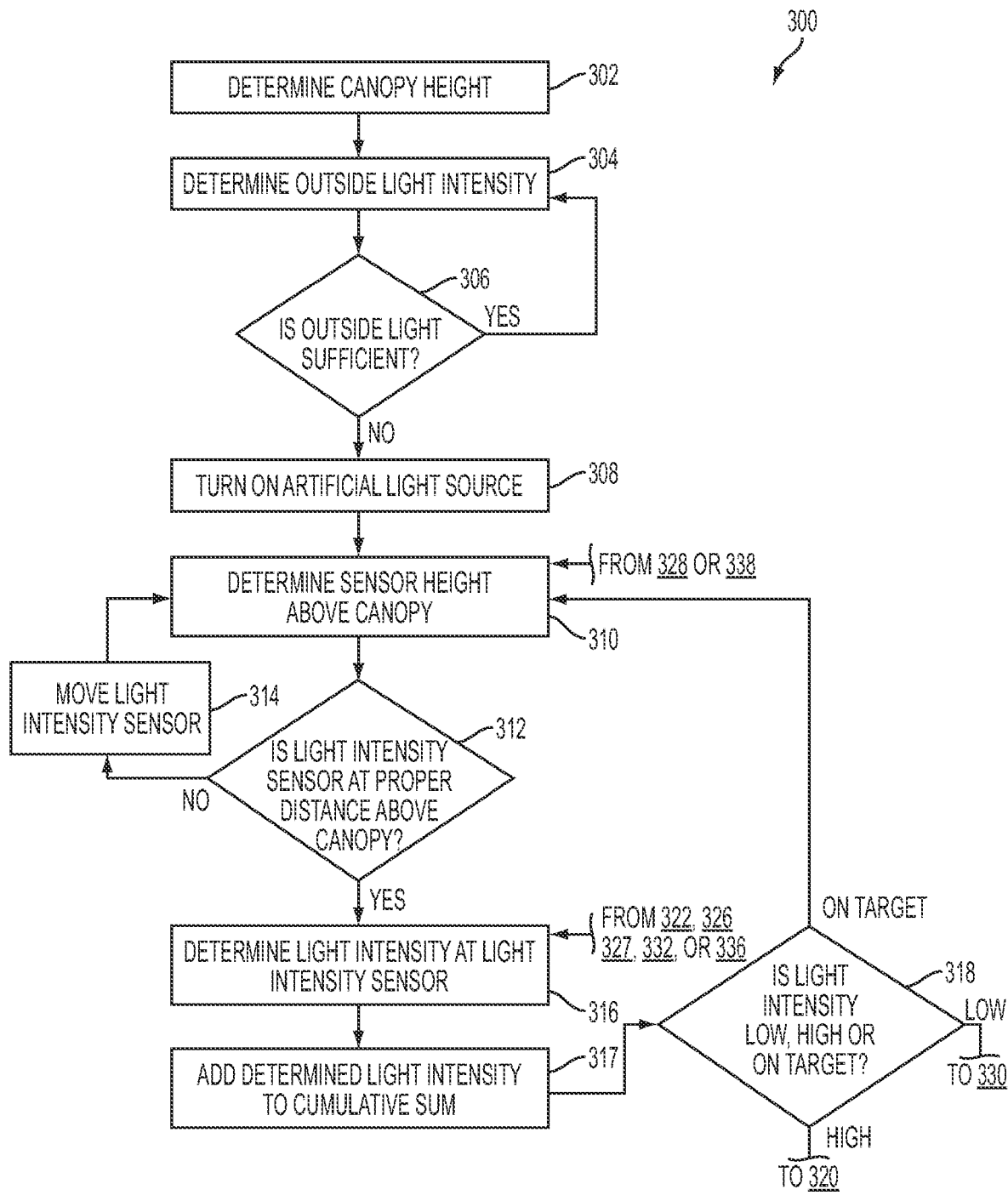
FIGS. 6A and 6B illustrate an exemplary processing sequence of the controller of the lighting system of FIG. 2.
Figure 6B:
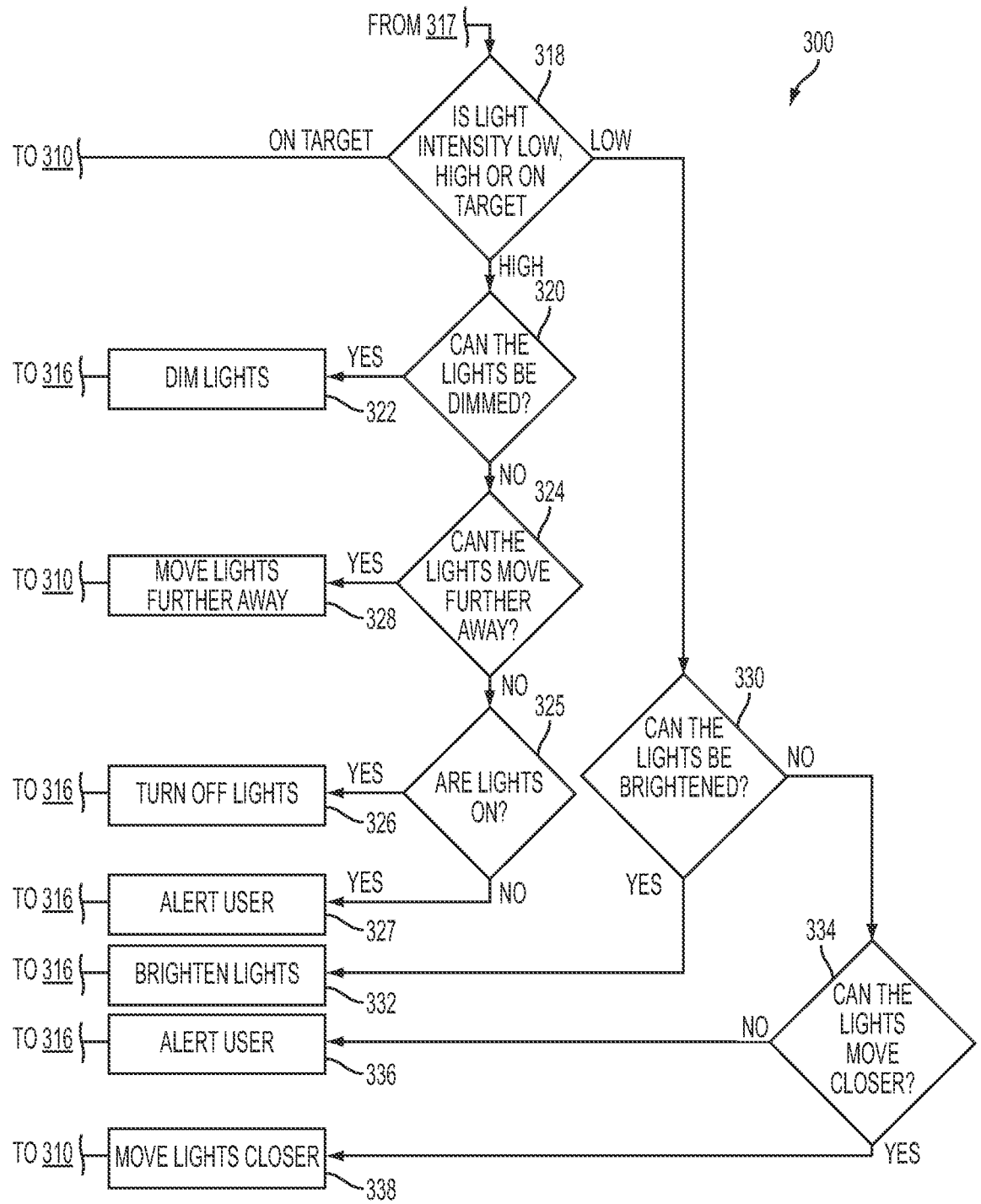

Referring to FIG. 6A-6B, an exemplary processing sequence 300 of light adjustment software 204 of controller 132 is illustrated. The execution of processing sequence 300 is described with reference to the system 100 illustrated in FIGS. 2 and 3.

Referring to FIG. 6A, in block 302, the canopy height is determined using distance sensor 160. Canopy height may be determined using distance sensor 160, height adjustment unit 140, and second height adjustment unit 180. In block 304, controller 132 measures the light intensity at outside lighting level sensor 16. In an exemplary embodiment, incident light with wavelengths from about 400 nm to about 700 nm are measured. In block 306, controller 132 determines whether the outside light level determined in block 304 is sufficient.

If in block 306, controller 132 determines the outside light is sufficient, it returns to monitoring the outside light intensity with sensor 16 in block 304. If in block 306, controller 132 determines that the outside light is not sufficient, in block 308, artificial lighting units 120 are turned on.

In block 310, controller 132 determines the height of light intensity sensor 170 above the canopy. In block 312, controller 132 determines whether light intensity sensor 170 is at distance 182 above plant canopy 108 equal to a predetermined distance. In an exemplary embodiment, the predetermined distance for distance 182 is from about one foot to about one and a half feet. In another embodiment, controller 132 determines whether the distance 182 light intensity sensor 170 is above plant canopy 108 is equal to a predetermined distance every five minutes. In one embodiment, the height of the light intensity sensor 170 above the canopy is determined prior to the lighting units 120 being turned on.

If in block 312, controller 132 determines that light intensity sensor 170 is not at the predetermined distance above the plant canopy 108, in block 314 controller signals one or both of drive 150 and second height adjustment unit 180 to increase or decrease the distance 182 between light intensity sensor 170 and plant canopy 108 until the light intensity sensor 170 is at the predetermined distance above plant canopy 108, as determined in block 312.

In one exemplary embodiment, if the distance 182 is too large, second height adjustment unit 180 lowers light intensity sensor 170, and if the distance 182 is too small, second height adjustment unit 180 raises light intensity sensor 170.

In another exemplary embodiment, if the distance 182 is too large, height adjustment unit 140 lowers light frame 134 including light intensity sensor 170, and if the distance 182 is too small, height adjustment unit 140 raises light frame 134 including light intensity sensor 170.

In still another exemplary embodiment, if the distance 182 is too large, height adjustment unit 140 lowers light frame 134 including light intensity sensor 170 and second height adjustment unit 180 further lowers light intensity sensor 170. If the distance 182 is too small, height adjustment unit 140 raises light frame 134 including light intensity sensor 170 and second height adjustment unit 180 further raises light intensity sensor 170.

Once the light intensity sensor 170 is at the predetermined distance, in block 316, controller 132 determines the light intensity at light intensity sensor 170. In an exemplary embodiment, incident light with wavelengths from about 400 nm to about 700 nm are measured by light intensity sensor 170.

In one embodiment, a target light intensity is provided to controller 132. The target light intensity may be stored in database 206, or it may be store elsewhere and accessed by controller 132 through network connection 220 or other suitable means. In one embodiment, the target light intensity is provided through user interface 210.

In an exemplary embodiment, the target light intensity is a constant value or range of values. In this embodiment, block 317 is omitted and controller compares the light intensity determined in block 316 to the target in block 318.

In another embodiment, a target light intensity provided is a sum of energy to be received for a given period. An exemplary period is one day. In one exemplary embodiment, the target sum for a period of one day is about 24 mol during the summer and about one-fourth that amount in the winter. In an exemplary embodiment, the target sum is divided into an equal portion for each of a given number of sub-periods. In one exemplary embodiment, a period of one day having a target of 24 mol for the day is divided into ten sub-periods of one hour each, each sub-period having a target of 2.4 mol. In this embodiment, the light intensity is determined in block 316 at least every sub-period, and the in block 317, the light intensity determined in block 316 is added to a cumulative sum. In one embodiment, the cumulative sum is determined by adding the product of the light intensity determined in block 316 with the length of the sub-period to the products of the light intensity and sub-period for each previous sub-period during the period. In another embodiment, where sub-periods are of equal length, the cumulative sum is determined by adding the light intensity determined in block 316 to the sum of the light intensities from each of the previous sub-periods during the period. In block 318, the calculated cumulative sum is compared to the target cumulative sum.

In still another embodiment, a series of target light intensities are each provided for each of a plurality of sub-periods that make up a period. An exemplary sub-period is one hour and an exemplary period is one day. An exemplary series of target light intensities includes increasing targets followed by decreasing targets. A series of cumulative sums for each sub-period can be determined from the series of target light intensities. In this embodiment, the light intensity is determined in block 316 at least every sub-period, and the in block 317, the light intensity determined in block 316 is added to a cumulative sum. In one embodiment, the cumulative sum is determined by adding the product of the light intensity determined in block 316 with the length of the sub-period to the products of the light intensity and sub-period for each previous sub-period during the period. In another embodiment, where sub-periods are of equal length, the cumulative sum is determined by adding the light intensity determined in block 316 to the sum of the light intensities from each of the previous sub-periods during the period. A target cumulative sum for each sub-period can be similarly determined from the preceding target light intensities. In block 318, the current cumulative sum is then compared to the target cumulative sum.

In block 318, controller 132 determines whether the light intensity determined in block 316 or the cumulative sum determined in block 317 is equal to, higher than, or lower than the target light intensity or target cumulative sum. In one embodiment, controller 132 makes the determination in block 318 about every sixty minutes. Other suitable frequencies of more or less than sixty minutes may also be used. If the determined light intensity or cumulative sum is equal to the target light intensity or cumulative sum, the light intensity is on target and controller 132 returns to block 310 to determine the light intensity sensor height above the canopy.

If the determined light intensity or cumulative sum is greater than the target light intensity or cumulative sum, the light intensity is high and controller 132 next considers block 320. If the determined light intensity or cumulative sum is less than the target light intensity or cumulative sum, the light intensity is low and controller 132 next considers block 330.

Referring to FIG. 6B, block 318 is again shown indicating controller 132 making a determination as to whether the light intensity is on target, high, or low. If the light intensity is on target, controller 132 returns to block 310 to determine the light intensity sensor height above the canopy.

If the light intensity is high in block 318, controller 132 next considers block 320. In block 320, controller 132 determines whether artificial lighting units 120 may be dimmed. If the lights may be dimmed, controller 132 and light controller 130 dim the artificial light source 120. Controller 132 then returns to block 316 to determine the light intensity at the light intensity sensor 170. If the lights cannot be dimmed, such as if artificial lighting units 170 do not contain dimming functionality, or if artificial lighting units 170 are at their lowest level, controller then moves to block 324. In block 324, controller 132 determines whether the lights may be moved further away.

If the lights may be moved further away, controller 132 causes height adjustment unit 140 to increase distance 141 between artificial lighting units 120 and plant canopy 108 by raising light frame 134 using drive 150. By increasing distance 141, the amount of light received by plant canopy 108 is decreased. The controller then returns to block 310 to determine the distance 182 between light intensity sensor 170 and plant canopy 108. If block 312 determines that light intensity sensor 170 is not at the proper height, then in block 314, second height adjustment unit 180 will be used to adjust the height of light intensity sensor 170. In one embodiment, when light frame 134 is moved in block 328, second height adjustment unit 180 moves light intensity sensor 170 an equivalent amount an opposite direction to maintain a consistent distance 182.

If the lights in block 324 cannot be moved further away, such as when light frame 134 is at its maximum height, controller 132 next determines whether artificial lighting units 120 are still turned on in block 325. If artificial lighting units 120 are on, in block 326, artificial lighting units 120 are turned off, and the controller 132 then returns to block 316 to determine the light intensity at the light intensity sensor 170. If artificial lighting units 120 are not on, in block 327, control 132 alerts the user that the light intensity is high and no further action can be taken, and the controller 132 then returns to block 316 to determine the light intensity at the light intensity sensor 170.

Referring again to block 318, if the light intensity is low, controller 132 next considers block 330. In block 330, controller 132 determines whether artificial lighting units 120 may be brightened. If the lights may be brightened, in block 332 controller 132 and light controller 130 brighten the artificial light source 120. Controller 132 then returns to block 316 to determine the light intensity at the light intensity sensor 170. If the lights cannot be brightened, such as if artificial lighting units 170 do not contain dimming functionality, or if artificial lighting units 170 are at their highest level, controller 132 then moves to block 334. In block 334, controller 132 determines whether the lights may be moved closer to plant canopy 108.

If the lights may be moved further closer, controller 132 causes height adjustment unit 140 to decrease distance 141 between artificial lighting units 120 and plant canopy 108 by lowering light frame 134 using drive 150 in block 338. By decreasing distance 141, the amount of light received by plant canopy 108 is increased. The controller 132 then returns to block 310 to determine the distance 182 between light intensity sensor 170 and plant canopy 108. If block 312 determines that light intensity sensor 170 is not at the proper height, then in block 314, second height adjustment unit 180 will be used to adjust the height of light intensity sensor 170. In one embodiment, when light frame 134 is moved in block 328, second height adjustment unit 180 moves light intensity sensor 170 an equivalent amount an opposite direction to maintain a consistent distance 182.

If the lights in block 334 cannot be moved closer, such as when light frame 134 is at its minimum height or distance 141 is less than a predetermined minimum distance such as from about three and one-half feet to about four feet, in block 336 controller 132 alerts the user that the light intensity is low and no further action can be taken, and the controller 132 then returns to block 316 to determine the light intensity at the light intensity sensor 170.

While this invention has been described as relative to exemplary designs, the present invention may be further modified within the spirit and scope of this disclosure. Further, this application is intended to cover such departures from the present disclosure as come within known or customary practice in the art to which this invention pertains.

The invention claimed is:

1. An apparatus for controlling the light intensity received at a plant canopy comprising:
   a frame;
   an artificial light source supported by the frame and positioned at a distance generally above a plant canopy;
   a light intensity sensor positioned to measure a light intensity, the light intensity sensor positioned at one of the plant canopy and a distance above the plant canopy;
   a first height adjustment unit configured to adjust the distance between the artificial light source and plant canopy; and
   a distance sensor supported by the frame and moveable with the artificial light source, the distance sensor measuring a distance between the distance sensor and the plant canopy, wherein the first height adjustment unit adjusts the distance between the artificial light source and the plant canopy in response to at least one of the light intensity measured by the light intensity sensor and the distance measured by the distance sensor further comprising a second height adjustment unit configured to adjust the relative position of the light intensity sensor to the artificial light source, wherein the second height adjustment unit adjusts the relative distance between the artificial light source and the light intensity sensor to maintain the light intensity sensor at a predetermined distance above the plant canopy.

2. The apparatus of claim 1, wherein the second height adjustment unit is supported by the frame.

3. The apparatus of claim 1 wherein the apparatus is located in a greenhouse having an internal frame, and the first height adjustment unit is attached to the internal frame.

4. The apparatus of claim 1 wherein the first height adjustment unit comprises a rotatable member, a drive for rotating the rotatable member, and a plurality of cables having a first end wrapped around the rotatable member and a second end attached to the frame, the frame being rigidly attached to the artificial light source, the plurality of cables raising the frame when the drive rotates the rotatable member in a first direction and lowering the frame when the drive rotates the rotatable member in a second direction.

5. The apparatus of claim 1 wherein the distance sensor is an ultrasound sensor.

6. The apparatus of claim 1, wherein the first height adjustment unit adjusts the distance between the artificial light source and the plant canopy in a first direction, and the second height adjustment unit adjusts the relative position of the light intensity sensor to the artificial light source in a second direction, the second direction being opposite of the first direction.

7. The apparatus of claim 1, wherein the light intensity sensor is positioned below the artificial light source.

8. The apparatus of claim 1, wherein the second height adjustment unit is separate from the first height adjustment unit.

9. A method of controlling the light intensity received at a plant canopy comprising the steps of:
   providing a plurality of plants defining a plant canopy;
   providing artificial light from an artificial light source positioned above the plant canopy;
   measuring a light intensity with a light intensity sensor at one of the plant canopy and a predetermined distance above the plant canopy;
   adjusting the distance between the plant canopy and artificial light source in response to the measured light intensity;

determining the distance between the light intensity sensor and the plant canopy with a distance sensor; and adjusting the position of the light intensity sensor relative to the artificial light source in response to the measured distance to position the light intensity sensor at the predetermined distance above the plant canopy.

10. The method of claim 9 further comprising dimming the artificial light source in response to the measured light intensity.

11. The method of claim 9 further said adjusting step further comprises the steps of:
  (a) providing a target light intensity;
  (b) comparing the measured light intensity with the target light intensity;
  (c) increasing the distance between the plant canopy and artificial light source when the measured light intensity is greater than the target light intensity; and
  (d) decreasing the distance between the plant canopy and artificial light source when the measured light intensity is less than the target light intensity.

12. The method of claim 11, wherein steps (a)-(d) are repeated at predetermined intervals.

13. The method of claim 12, wherein the target light intensity at each predetermined interval is the same.

14. The method of claim 12, wherein the target light intensity at each predetermined interval is cumulative of the target light intensity of previous periods and the measured light intensity at each predetermined interval is cumulative of the target light intensity of previous periods.

* * * * *